United States Patent [19]
Paul et al.

[11] Patent Number: 5,675,761
[45] Date of Patent: Oct. 7, 1997

[54] METHOD AND SYSTEM FOR PROVIDING DISCONTIGUOUS DRIVE SUPPORT

[75] Inventors: John David Paul, Boynton Beach; Robert Duane Johnson, Boca Raton, both of Fla.

[73] Assignee: International Business Machines Corporation, Armonk, N.Y.

[21] Appl. No.: 242,935

[22] Filed: May 16, 1994

[51] Int. Cl.$^6$ .......................... G06F 12/00; G06F 12/02; G06F 9/26; G06F 9/32
[52] U.S. Cl. .................. 395/404; 395/427; 395/438; 395/442; 395/439; 395/416; 395/182.05; 361/685
[58] Field of Search ........................ 395/427, 438, 395/700, 404, 401, 442, 412, 416, 200.05, 439, 182.03; 371/10.1; 361/729, 685

[56] References Cited

U.S. PATENT DOCUMENTS

| | | | |
|---|---|---|---|
| 4,982,324 | 1/1991 | McConaughy et al. | 395/200.09 |
| 5,239,445 | 8/1993 | Parks et al. | 361/729 |
| 5,274,645 | 12/1993 | Idleman et al. | 371/10.1 |
| 5,457,791 | 10/1995 | Matsumoto et al. | 395/182.03 |
| 5,483,419 | 1/1996 | Kaczeus et al. | 361/685 |

FOREIGN PATENT DOCUMENTS

| | | | |
|---|---|---|---|
| 2284080 | 5/1995 | United Kingdom | G06F 13/38 |
| 2284080 A | 5/1995 | United Kingdom | G06F 13/38 |

Primary Examiner—David K. Moore
Assistant Examiner—Than V. Nguyen
Attorney, Agent, or Firm—Bernard D. Rogdon

[57] ABSTRACT

A method and system for supporting discontiguous drive arrangements in a computer system using IDE control parameters having a central processing unit, user interface, short term volatile memory storage, and at least one, to four or more long term static memory storage devices, all of which are connected by a bus to the CPU, is used to provide access to the long term memory storage devices in a manner transparent to both the system and the user.

2 Claims, 5 Drawing Sheets

METHOD AND SYSTEM FOR PROVIDING DISCONTIGUOUS DRIVE SUPPORT

BACKGROUND OF THE INVENTION

1. Technical Field

This invention relates generally to hard file controller systems in a computer environment and, specifically, to IDE controller systems used with hard disks in a personal computer environment. More specifically, the present invention relates to an IDE controller system and method for maximizing the configurations having at least two hard files so as to improve overall system performance.

2. Description of the Related Art

Currently, personal computer systems operate under many constraints that limit their effectiveness and ability to perform at higher levels. One such problem involves the number of hard disk drives that may be supported under an IDE (integrated drive electronics) or AT specification. Normally, a typical personal computer using the IDE standard for controlling hard disk drives can accommodate only two disk drives. When two disk drives are attached to the same connector, the first is designated as the master and the second is designated as the slave. The master and slave designations are determined on the drives themselves by setting their jumpers or switches. The IDE standard allows for two additional hard drives to be added, but to do so requires adding another adapter card or using special drives or both, which increases the cost of the system. Further, the BIOS system (basic input/output system), normally does not support more than two drives directly.

System designer and builders are beginning to add the secondary controllers, but this support does not generally extend to chip sets or advanced input/output devices. Therefore, a user would typically still be required to install a second controller with a jumper selectable interrupt request and address to attach more than two IDE devices to the user's system. For example, FIG. 1 illustrates a host address adapter 10 found in the prior art. Address adapter 10 is an IDE controller device that connects to a first drive 12, and may include a second drive 14, via bus 16. Drive events are signalled by interrupt request (IRQ) 14. Since the adapter 10 is the primary address adapter, it is called by address locations 1f0h–1f7h/3f6h–3f7h. Drive 12 is always assigned the status of master drive, while drive 14 is always the slave drive to drive 12. If both drives are of dissimilar characteristics, adapter 10 operates to accommodate the drive with the lowest performance characteristics, which requires the drive with the higher characteristics to operate at that common characteristic as the slower drive. If a user desires to add a third drive, an additional address adapter card like the one in FIG. 1 must be added and configured as subservient to the first adapter card with the drives thereon also subservient to the drives on the first adapter card.

Accordingly, what is needed is an IDE controller configuration that supports all four devices possible under the IDE standard, but is transparent to the user as well as to the specific devices attached to the system.

SUMMARY OF THE INVENTION

It is therefore one object of the present invention to provide improved hard file controller systems in a computer environment.

It is another object of the present invention to provide improved IDE controller systems used with hard disks in a personal computer environment.

It is yet another object of the present invention to provide an IDE controller system and method for maximizing system configurations having at least two hard files so as to improve overall system performance.

The foregoing objects are achieved as is now described. According to the present invention, a method and system for supporting discontiguous drive arrangements in a computer system using IDE control parameters is disclosed. A standard computer system having a central processing unit, user interface, short term volatile memory storage, and at least one to four or more long term static memory storage devices, all of which are connected by a bus to the CPU, is used to provide access to the long term memory storage devices in a manner transparent to both the system and the user. First, the system defines a primary address for a first set of long term storage, e.g., CMOS, locations as well as a secondary address for a second set of long term storage, e.g., CMOS, locations contiguous to the first set of long term storage locations. Next, the system defines first and second physical drive numbers within the primary address and within the secondary address. Next, the system determines whether at least one long term static memory devices is present, which such device has a logical drive number. Next, the system provides a translation between the physical number of either the primary address or the secondary address and the logical drive number corresponding to the present long term static memory devices previously identified. The system and method assign the first physical drive number within the primary or secondary address to corresponding identified long term memory device and similarly they progress to assign the second physical drive number to a corresponding second long term memory device identified. Additionally, the system may assign a third physical drive number of the secondary address to a corresponding third long term static memory device.

In one embodiment, where four drive locations are defined within the computer system, the second logical drive number of the primary address relates to the second set of memory locations contiguous to a first set of memory locations assigned to the first logical drive number of the primary address. Likewise, the first logical drive number of the secondary address is associated with a third set of locations contiguous to the second logical drive number associated with the primary address. Further, the second logical drive number is associated with a fourth set of locations contiguous with the first logical drive numbers of the secondary address.

The detection of the presence of the hard files is performed in the power on self test, while the code used to prepare the drives in the controller to receive and act upon subsequent commands, and initialize defined memory locations with appropriate drive geometry and physical address data for subsequent use by the system, is found in the BIOS.

The above as well as additional objects, features, and advantages of the present invention will become apparent in the following detailed written description.

BRIEF DESCRIPTION OF THE DRAWINGS

The novel features characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENTS

Figure 2:
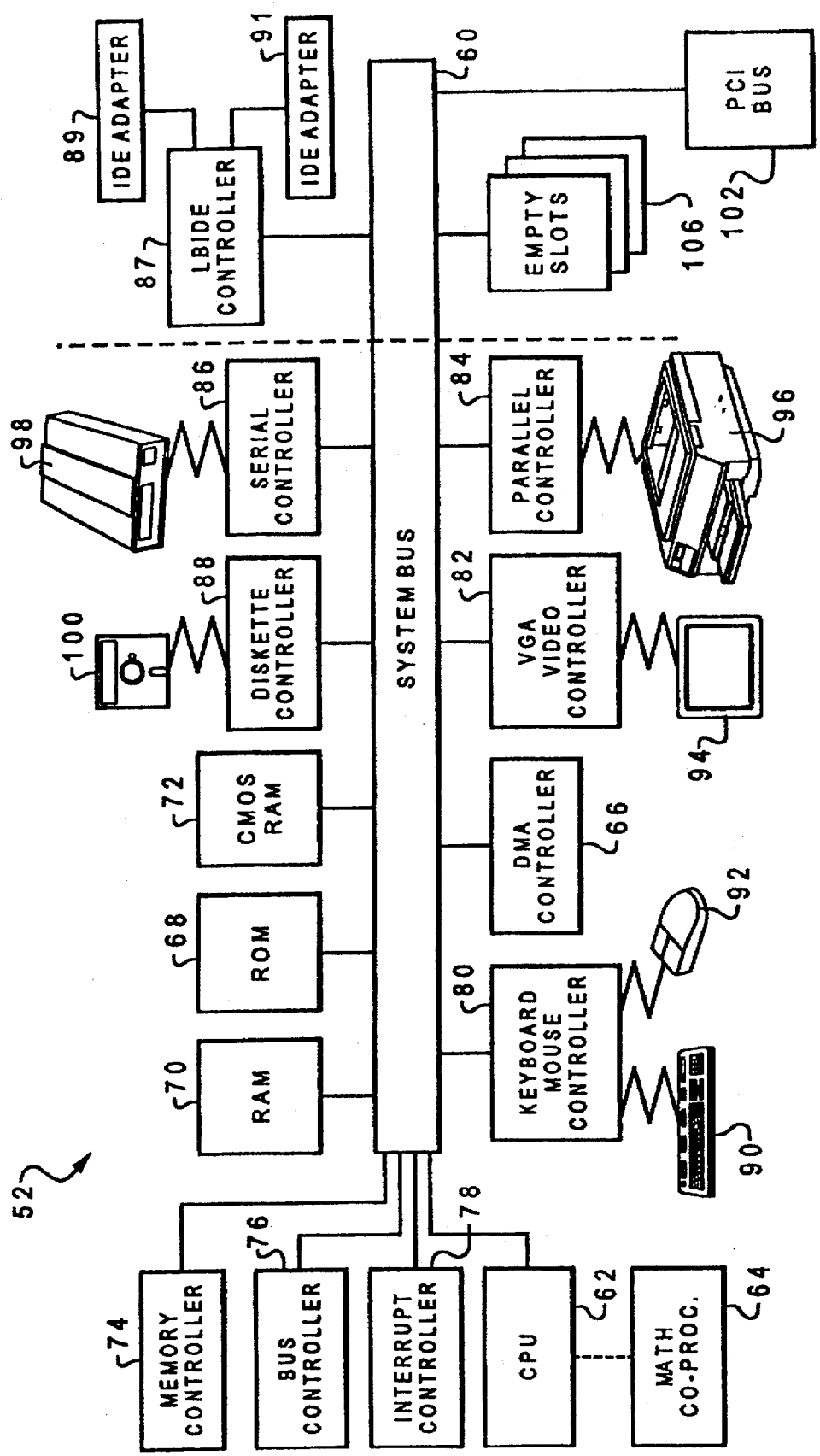
FIG. 2 depicts a block diagram of selected components in a computer system using the improved IDE controller system according to the present invention.

FIG. 2 depicts a block diagram of selected components in a personal computer in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, local bus IDE (LBIDE) controller 87, video controller 82, parallel controller 84, serial controller 86, diskette controller 88. LBIDE controller 87 provides a hardware interface for a primary address IDE adapter 89 and a secondary address IDE adapter 91. Both IDE adapters 89 and 91 can accept two IDE drives in a Master-Slave arrangement. Also, each adapter may have only one drive connected thereto with primary address IDE adapter 89 serving as the primary master, and secondary address IDE adapter 91 serving as the secondary master. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as PCI bus 102, which provides a hardware interface for PCI-based devices. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL (programmable array logic) or EPROM programming device, and the like also may be utilized in addition to or in place of the hardware already depicted.

Figure 1:
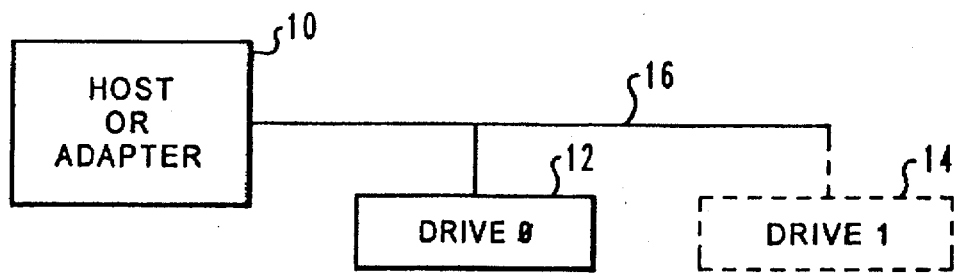
FIG. 1 is a hard file configuration system capable of accommodating two drives according to the prior art.
Figure 3:
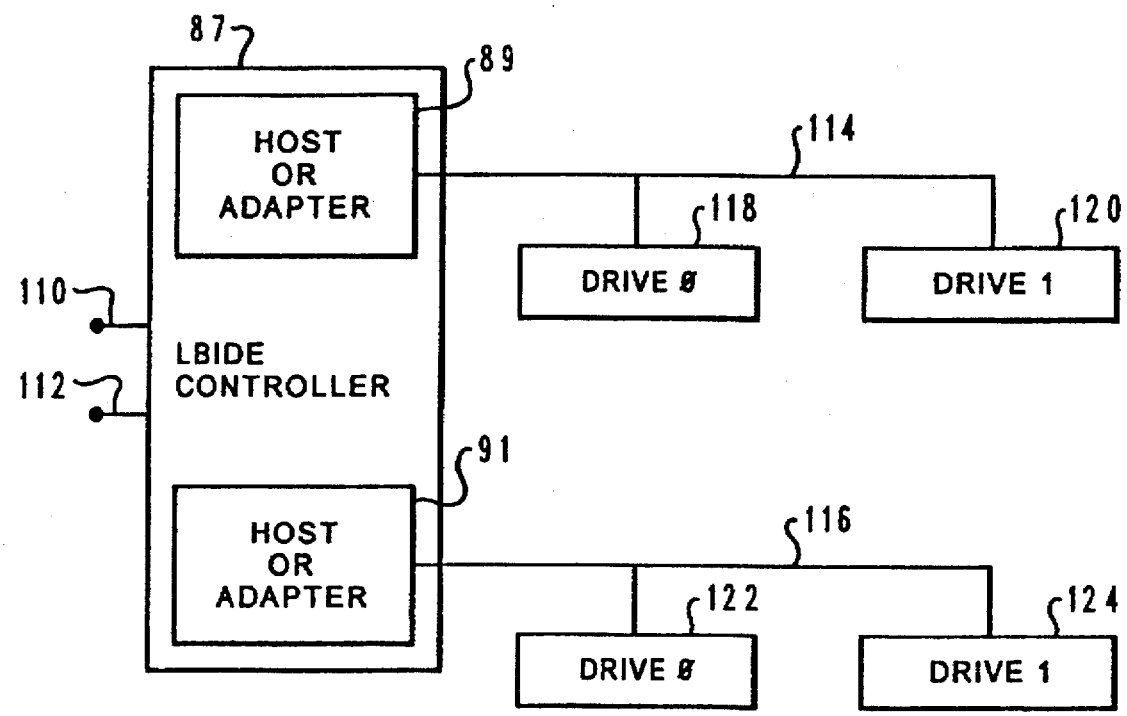
FIG. 3 depicts the IDE controller system according to the present invention.

The local bus IDE controller 87, which can run on a VESA local bus slot, is shown in greater detail in FIG. 3. LBIDE controller 87 may be implemented in a single chip design and is attached to a data bus 110 and an address bus 112. LBIDE controller 87 provides for two equivalent address sets or adapters 89 and 91, which are attached to primary bus 114 and secondary bus 116, respectively. A master drive 118 attaches to primary bus 114 as does a slave drive 120. A secondary master drive 122 connects to secondary bus 116 as does secondary slave drive 124.

With the two address set adapters 89 and 91, LBIDE controller 87 uses both interrupt requests (IRQ) 14 and 15 and their respective task-file address locations 1F0 –1F7h/ 3F6 –3F7h, 170 –177h/376–377h. Before the present invention, a second adapter card was necessary to use IRQ 15 and its associated task file addresses 170–177h/ 376–377h.

Figure 4:
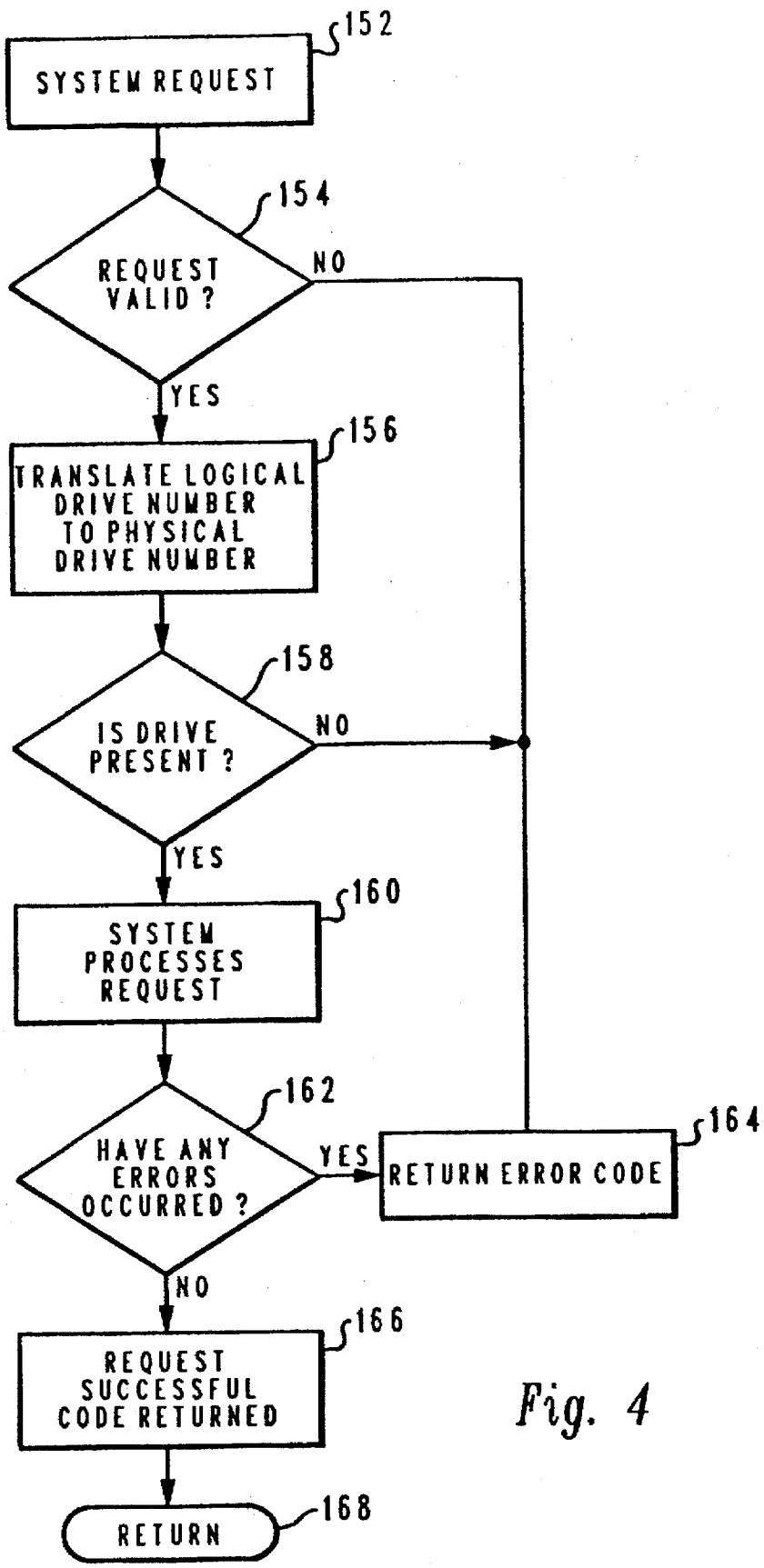
FIG. 4 is a flowchart diagram of the system establishing the address controller of FIG. 2.

In order for the computer to access the hard drives connected to either host adapter 89 or 91, the system logical drive number must be translated to the physical drive number. FIG. 4 is a flowchart depicting the system accessing the drives connected to LBIDE controller 87. At the initial power-up, the system performs a power on self test (POST), not shown. POST contains routines to detect the presence of the hard files connected to LBIDE controller 87 and to determine the physical address of each drive present. The code also prepares the drives and the controller to receive and act upon subsequent commands, such as read data or write data, and initializes defined memory locations with appropriate drive geometry and physical address data for subsequent use by the system BIOS or similar access mechanisms.

When the User or Operating System needs to communicate with the drive (Read Data, Write Data, etc.) a System Call or request to the BIOS (or Device Driver) is done in step 152. The BIOS contains routines to process the request. In step fashion, the system will receive the request, prepare work areas, and determine if the request is within the set of defined functions that the BIOS is capable of performing. If in step 154, the request is invalid, the system returns with an error code, in step 164. If the request is valid, in step 156, the system translates the logical drive number to the physical drive number then determines if that drive is present in step 158. If the drive is present, the system processes the request in step 160. Next, the system determines if any errors occurred during the processing of the request in step 162. If there are errors, the system returns an error code in step 164. If there are no errors, the system returns with a request successful code in step 166, and then leaves the BIOS to return to the operating system in step 168.

In the operating system, drives 118, 120, 122, and 124 of FIG. 3 are known respectively as drives 80h, 81h, 82h and 83h. Moreover, drive 80h is always the first drive and drive 81h is always the second drive. In prior systems, this hierarchy required that if there were two drives in the system, both had to be connected to the same adapter in a master-slave relation. Since the system shown in the flowchart of FIG. 4 is able to assign a logical drive to a particular physical drive, this restriction in the prior systems is removed. Accordingly, the user can place a first drive on a first adapter card and a second drive on a second adapter card in a discontiguous memory addressing scenario. The system will still access both drives even though a second slave drive is missing from the primary address adapter. The advantage of this arrangement is that the system has the capability of supporting four drives directly on the system in the form of two host attachments to the drives. This allows drive performance characteristics to be fully utilized as determined by the manufacturer. This allows drives to be mixed on a given system by manufacture and performance capability.

Each of the two adapters are independently programmed so that the performance of the attached drives may be maximized. For example, if the system has two drives of different read/write bus cycle times, e.g., the primary address drive has a read/write bus cycle time of one hundred eighty nanoseconds, while the secondary address drive has an read/write time of six hundred nanoseconds, both drives can operate at their maximum performance characteristics if attached to separate host adapters. However, if both drives were attached to the same adapter, such as primary address adapter 89, then the faster drive would have to be set to operate at the same access time as the slower drive. In the prior systems, this would have always been the rule if there were only two drives used. In the preferred embodiment, both drives would be attached to independent address adapters so that they could run at their maximum access speeds and characteristics.

This arrangement allows for the system user to determine the system performance desired as the user can place one or more high performance drives on one of the two address adapters, while placing a slower drive on the other address adapter independently of the first, thus improving the performance according to the maximum characteristics of the devices. Additionally, the system user need not worry about maintaining the address sets in the required contiguous arrangement previously demanded. For example, if the system user did not know the drive performances of both drives that he wished to connect, he could connect one to the first address adapter and the other to the second address adapter for automatic configuration for maximum performance. Also, the system user could place both drives on the same address adapter and obtain the same performance of the system with the slowest times. Further, the operating system itself would not need to be modified as all these changes occur in the BIOS during the power on self test. Additionally, the standard logical drive numbers of 80h and 81h would still be the form of the drive and the BIOS would still understand that 80h is the first physical drive and that 81h is the second physical drive no matter how they are attached to the two address adapters.

Figure 5:
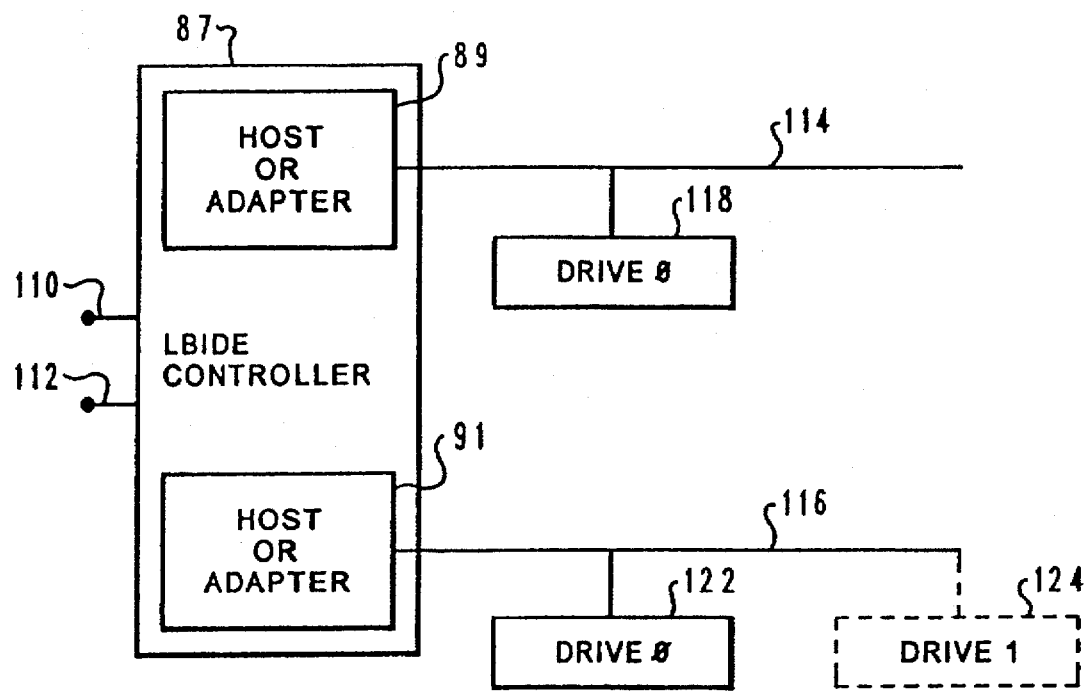
FIG. 5 is a block diagram of the invention according to FIG. 3 wherein the primary address and the secondary address include drive connections.
Figure 6:
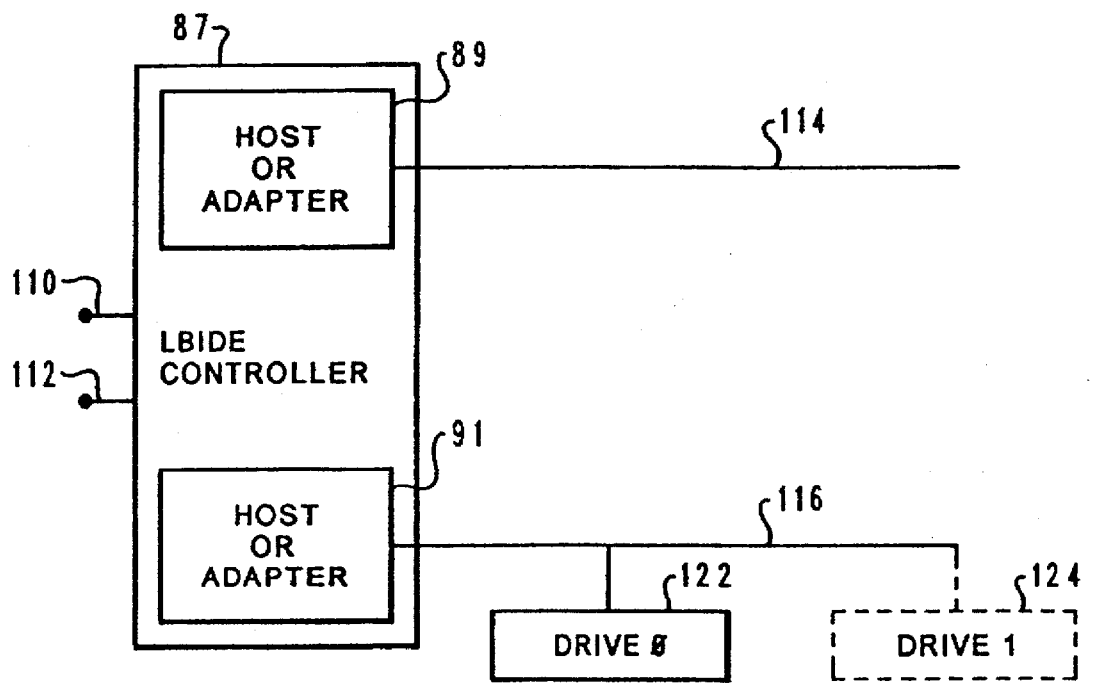
FIG. 6 depicts a block diagram of the IDE controller system of FIG. 3 wherein the secondary address includes at least one drive device.

To illustrate, different drive configurations are depicted in FIGS. 5 and 6. In FIG. 5, two different drives are connected to LBIDE controller 87, one of which is attached to primary address adapter 89 while a second is attached to secondary address adapter 91. A third drive may also be attached to secondary address adapter 91.

FIG. 6 depicts a two drive arrangement where the first and second drives are connected to secondary address adapter 91. Meanwhile, no drive is attached to primary address adapter 89. Both embodiments of FIG. 5 and FIG. 6, and the potential alternatives as depicted by the alternative drive 124 attached to the secondary address adapter 91, are not otherwise possible in prior IDE drive configurations.

Figure 7:
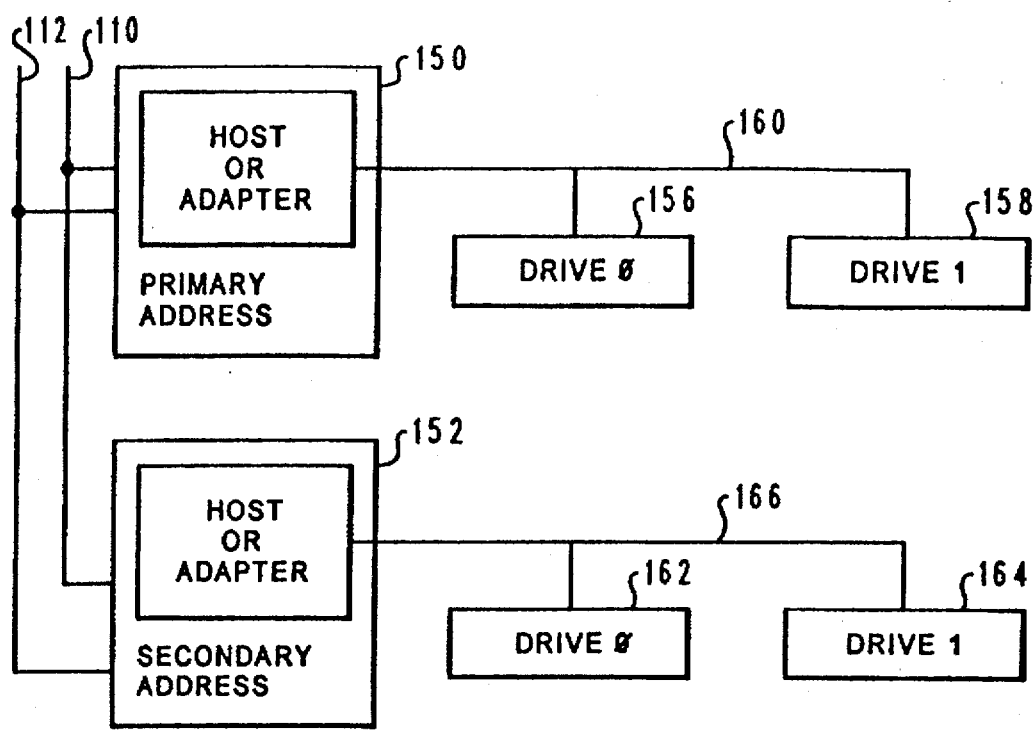
FIG. 7 is a block diagram of separate IDE controller devices providing primary address and secondary address control, respectively.
Figure 8:
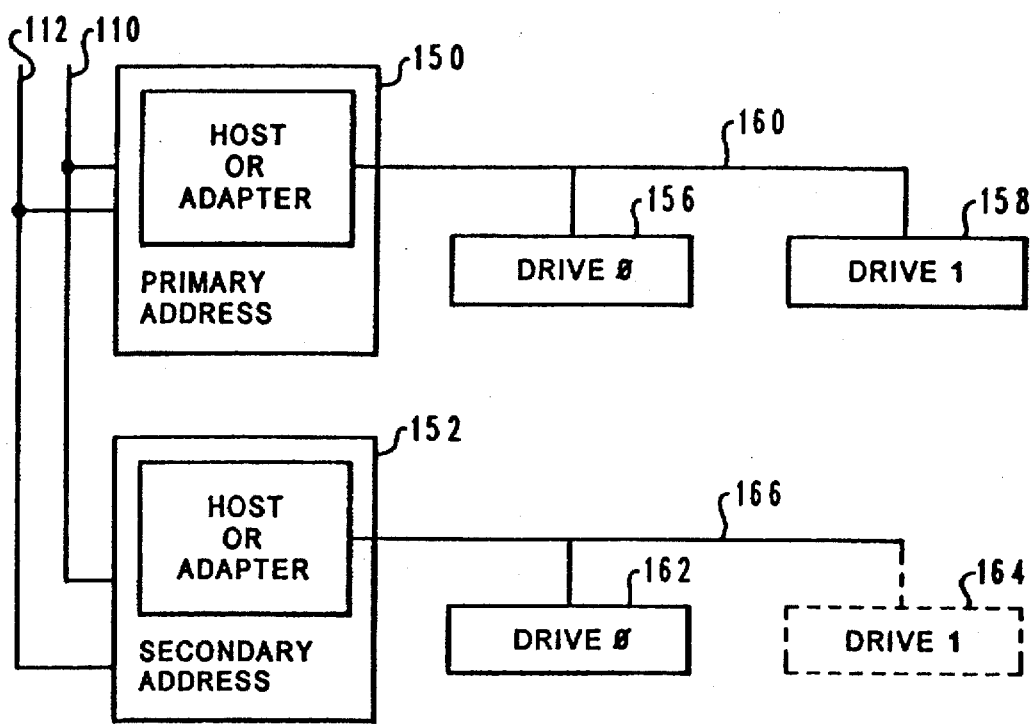
FIG. 8 depicts the dual control device of FIG. 7, but in an alternative embodiment.

FIGS. 7 and 8 illustrate alternative embodiments to the single controller design illustrated in FIG. 3. FIG. 7 depicts an IDE controller system having dedicated primary address adapters 150 and secondary address adapter 152. Each is connected to the data bus 110 and address bus 112. Primary address adapter 150 is further connected to drives 156 and 158 through drive bus 160. Secondary address controller 152 further connects to drives 162 and 164 through drive connector bus 166.

FIG. 8 depicts a block diagram of a computer system having three drives, two of which are connected to the primary address controller 150 and one connected to secondary address controller 152. Drives 156 and 158 are known as drive 80h and drive 81h under the BIOS designation at start up. This arrangement may have drives 156 and 158 having the same performance characteristics as each other while drive 162 has different performance characteristics and, therefore, it is preferred that it be connected to a separate address controller while drive 162 is known as drive 82h.

While the invention has been particularly shown and described with reference to a preferred embodiment, it will be understood by those skilled in the art that various changes in form and detail may be made therein without departing from the spirit and scope of the invention. For example, rather than a hard disk storage device, a CD-ROM drive or a tape back-up device may be connected to one of the address controllers. Other examples will also be evident to those skilled in the art.

What is claimed is:

1. A method for supporting discontiguous drive arrangements in a hierarchy comprising contiguous primary master, primary slave, secondary master and secondary slave storage locations in a data processing system having facility for four attachable integrated drive electronics (DE) storage devices and said data processing system programmed to be operative with (i) less than all four of the attachable IDE storage devices and (ii) either (a) the primary master storage location being vacant or (b) two or less contiguous storage locations, said data processing system using IDE control parameters and having a central processing unit, short term volatile memory, at least one IDE controller for attachment of the attachable IDE storage devices, that at least one controller operative at either a primary set of I/O addresses corresponding, respectively, to the primary master and primary slave storage locations or a secondary set of I/O addresses corresponding, respectively, to the secondary master and secondary slave storage locations, each set of the primary and the secondary I/O addresses providing access for a master IDE storage device and a slave IDE storage device form the less than four of the attachable IDE storage devices, a long term static memory device and a system bus operatively coupling the central processing unit, the short term volatile memory and the at least one controller, one to another, the method comprising the steps of:

defining a first, a second, a third and a fourth element in a data structure in the long term static memory device to have each of the four elements of the data structure, respectively relating to one of the less than four attachable IDE storage devices;

determining in a PM (primary master) step if one of the IDE storage devices is attached as the master IDE storage device of the at least one IDE controller at the primary set of I/O addresses;

storing in the first element of the data structure an IDE storage indicator coding if one of the less than four IDE storage devices is determined to be attached in the PM step;

storing in the first element of the data structure a null coding if an IDE storage device is determined not to be attached in the PM step;

determining in a PS (primary slave) step if one of the less than four IDE storage devices is attached as the slave IDE storage device of the at least one IDE controller at the primary set of I/O addresses;

storing in the second element of the data structure an IDE storage indicator coding if one of the less than four IDE storage devices is determined to be attached in the PS step;

storing in the second element of the data structure a null coding if one of the IDE storage devices is determined not to be attached in the PS step;

determining in a SM (secondary/master) step if one of the less than four IDE storage devices is attached as the master IDE storage device of the at least one IDE controller at the secondary set of I/O addresses;

storing in the third element of the data structure an IDE storage indicator coding if one of the less than four IDE storage devices is determined to be attached in the SM step;

storing in the third element of the data structure a null coding if one of the IDE storage devices is determined not to be attached in the SM step;

determining in a SS (secondary slave) step if one of the less than four IDE storage devices is attached as the slave IDE storage devices of the at least one IDE controller at the secondary set of I/O addresses;

storing in the fourth element of the data structure an IDE storage indicator coding if one of the less than four IDE storage device is determined to be attached in the SS step;

storing in the fourth element of the data structure a null coding if one of the IDE storage devices is determined not to be attached in the SS step;

assigning a unique physical drive number to each of the four elements of the data structure;

translating a logical drive number, representing the first logical drive of the data processing system, by searching sequentially the first, the second, the third and the fourth elements of the data structure for the first occurrence of any IDE storage indicator coding and substituting the physical drive number assigned to the respective element of the data structure at any first occurrence of an IDE storage indicator coding found in the search of the data structure; and repeating the translating step, as necessary, for the second and third occurrence of any IDE storage indicator coding and substituting any physical drive number assigned to the respective element of the data structure an any, respective, second or third occurrence of an IDE storage indicator coding found in the search of the data structure.

2. A method for supporting discontiguous drive arrangements in a hierarchy comprising contiguous primary master, primary slave, secondary master and secondary slave storage locations in a data processing system having facility for four integrated drive electronics (IDE) storage devices and said data processing system programmed to be operative with (i) less than four attached IDE storage devices and (ii) either (a) the primary master storage location being vacant or (b) two or less contiguous storage locations, said data processing system using IDE control parameters and having a central processing unit, short term volatile memory, at least one controller for the attached IDE storage devices, the at least one controller operative at either a primary or secondary set of I/O addresses corresponding, respectively, to the primary master and primary slave storage locations or to the secondary master and secondary slave storage locations, each set of I/O address providing access for a master and slave IDE storage device from the attached less than four IDE storage devices, and at least one long term static memory device and a system bus operatively coupling the central processing unit, short term volatile memory and the at least one controller one to another, the method comprising the steps of:

establishing a four element data structure in the at least one long term static memory device such that each element is uniquely associated with one of the less than four attached IDE storage devices;

determining if one of the less than four attached IDE storage devices is attached or absent as the master device of the IDE controller at the primary I/O address;

storing in the first element of the data structure a location indicator if one of the less than four attached IDE storage devices is attached;

storing in the first element of the data structure an absence indicator if an IDE storage device is absent;

determining if one of the less than four attached IDE storage devices is attached or absent as the slave device of the IDE controller at the primary I/O address;

storing in the second element of the data structure a location indicator if one of the less than four attached IDE storage devices is attached;

storing in the second element of the data structure an absence indicator if an IDE storage device is absent;

determining if one of the less than four attached IDE storage devices is attached or absent as the mater device of the IDE controller at the secondary I/O address;

storing in the third element of the data structure a location indicator if one of the less than four attached IDE storage devices is attached;

storing in the third element of the data structure an absence indicator if an IDE storage device is absent;

determining if one of the less than four attached IDE storage devices is attached or absent as the slave device of the IDE controller at the secondary I/O address;

storing in the fourth element of the data structure a location indicator if one of the less than four attached IDE storage devices is attached;

storing in the fourth element of the data structure an absence indicator if an IDE storage device is absent;

assigning a unique physical drive number to each first, second, third and fourth element in the data structure;

translating a drive number representing the first logical drive by sequentially searching the data structure for the first occurrence of the location indicator and substituting the physical drive number assigned to the element where any first occurrence of the location indicator is located; and repeating the translating step, as necessary, for the second and third occurrence of any location indicator and substituting the physical drive number assigned to the respective element at any, respective, second or third occurrence of a located location indicator.

\* \* \* \* \*